(12) United States Patent
Wezyk et al.

(10) Patent No.: US 6,582,009 B2
(45) Date of Patent: Jun. 24, 2003

(54) CONVERTIBLE VEHICLE WITH A WIND DEFLECTOR

(75) Inventors: Wojciech Wezyk, Sindelfingen (DE); Thomas Halbweiss, Remseck (DE)

(73) Assignee: CTS Fahrzeug-Dachsysteme GmbH, Hamburg (DE)

( * ) Notice: Subject to any disclaimer, the term of this patent is extended or adjusted under 35 U.S.C. 154(b) by 0 days.

(21) Appl. No.: 10/112,606

(22) Filed: Mar. 16, 2002

(65) Prior Publication Data

US 2002/0149229 A1 Oct. 17, 2002

(30) Foreign Application Priority Data

Mar. 19, 2001 (DE) .......................... 101 13 427

(51) Int. Cl.[7] ................ B60J 1/20; B60J 7/08
(52) U.S. Cl. ............. 296/180.1; 296/107.07; 296/107.08; 296/107.17; 296/85; 296/108; 296/146.14
(58) Field of Search ............. 296/180.1, 107.07, 296/107.08, 107.16, 107.17, 85, 108, 146.14

(56) References Cited

U.S. PATENT DOCUMENTS

| | | | | |
|---|---|---|---|---|
| 2,747,923 A | * | 5/1956 | McLean | 296/107.07 |
| 2,768,024 A | * | 10/1956 | Spear, Jr. | 296/107.07 |
| 2,785,922 A | * | 3/1957 | Chika | 296/107.07 |
| 2,836,457 A | * | 5/1958 | Beerman et al. | 296/107.07 |
| 2,947,570 A | * | 8/1960 | Noe | 296/107.08 |
| 5,211,718 A | * | 5/1993 | Gotz et al. | 296/180.1 |
| 5,658,039 A | | 8/1997 | Bennett | |
| 6,142,555 A | * | 11/2000 | Huber | 296/107.07 |
| 6,149,223 A | * | 11/2000 | Baessler et al. | 296/107.07 |
| 6,318,793 B1 | * | 11/2001 | Rapin et al. | 296/107.08 |
| 6,322,131 B1 | * | 11/2001 | Maass et al. | 296/107.07 |
| 6,402,227 B1 | * | 6/2002 | Riehle et al. | 296/180.1 |
| 6,431,637 B2 | * | 8/2002 | Maass | 296/107.07 |
| 6,467,832 B2 | * | 10/2002 | Schutt et al. | 296/107.08 |
| 6,481,781 B2 | * | 11/2002 | Bergerhoff et al. | 296/107.17 |
| 2002/0024231 A1 | * | 2/2002 | Schutt | 296/107.08 |

FOREIGN PATENT DOCUMENTS

| | | |
|---|---|---|
| DE | 43 20 603 | 1/1995 |
| DE | 195 17 063 | 6/1996 |
| DE | 43 38 102 | 5/1998 |
| DE | 196 46 240 | 5/1998 |
| DE | 197 04 846 | 8/1998 |
| DE | 198 30 699 | 1/2000 |
| DE | 199 13 033 | 10/2000 |
| DE | 199 48 666 | 4/2001 |

OTHER PUBLICATIONS

Automotive Engineering International, Jul. 2002, pp. 88–91.*

* cited by examiner

Primary Examiner—D. Glenn Dayoan
Assistant Examiner—Hilary Gutman
(74) Attorney, Agent, or Firm—Klaus J. Bach

(57) ABSTRACT

In a convertible vehicle with a hardtop vehicle roof comprising at least two roof parts, which are movable between a closed position in which to roof parts cover the interior space of the vehicle and an open position in which the roof parts are in storage compartment behind the interior vehicle space, and wherein the roof includes a rear window which is removable from the roof and utilized, in a raised upright position, as a wind deflector, the roof parts and the window are separated from each other and fitted when the roof is open, into the storage compartment behind the interior space in an upright position one behind the other transverse to the longitudinal vehicle direction.

6 Claims, 2 Drawing Sheets

CONVERTIBLE VEHICLE WITH A WIND DEFLECTOR

BACKGROUND OF THE INVENTION

The invention relates to a convertible vehicle with hardtop vehicle roof which is movable between a closed position in which it covers the vehicle interior and an open position in which the vehicle is in a cabriolet configuration and the roof is disposed in a vertical orientation in a storage space. The roof includes a rear window, which forms a wind deflector which, in the cabriolet configuration of the vehicle, is lowered into the storage compartment.

In convertible vehicles, a wind deflector is generally provided directly behind the seats which wind deflector is to prevent, or reduce, air turbulence in the vehicle interior when the vehicle roof is opened.

DE 198 30 699 A1 discloses such a wind deflector which is supported so as to be pivotable about a transverse vehicle axis between a horizontal inactive position and a vertical operating position. This wind deflector can be moved relatively easily between the vertical operating position and the horizontal inactive position. However, during opening and closing of vehicle roof, the wind deflector must be out of the path of movement of the vehicle roof in either its horizontal or its vertical position and also the storage space or the opening of the storage space, into which the vehicle roof is to be moved, must not be obstructed.

DE 199 13 033 A1 discloses the use of a rear window as a wind deflector wherein the rear window can be released from its position in the vehicle roof and can be lowered and raised in guide rails which are mounted on the vehicle body. Although the double function of the rear window as a window in the vehicle roof and as a wind deflector in connection with a hardtop is known from this publication, the problem of where to deposit the hard top structure in the cabriolet configuration of the vehicle is not considered. Generally, the rigid roof shells of a hardtop are pivoted rearwardly into a rear storage space in which the roof shells are disposed on top of, and about parallel to, each other with their top surface essentially in a horizontal orientation. This however requires a relatively large storage space in the vehicle in longitudinal direction whereby the useable trunk space is highly restricted.

It is the object of the present invention to provide a convertible vehicle with a hardtop vehicle roof including a wind deflector in which the vehicle roof can be stored in a cabriolet configuration of the vehicle in a space-saving manner.

SUMMARY OF THE INVENTION

In a convertible vehicle with a hardtop vehicle roof comprising at least two roof parts which are movable between a closed position in which the roof covers the interior space of the vehicle and an open position in which the roof is in storage compartment behind the interior vehicle space, and wherein the roof includes a rear window, which is removable from the roof and utilized in a raised upright position as a wind deflector, the roof parts and the window are separated from each other and fitted, when the roof is open, into the storage compartment behind the interior space in an upright position one behind the other transverse to the longitudinal vehicle direction.

The rear window is removably received in an opening in the vehicle roof and can be removed therefrom for use as a wind deflector when the vehicle is in a cabriolet configuration. With the rear window removable from the roof, the rear window can be arranged in the cabriolet configuration of the vehicle in a position in which it projects upwardly behind or between the vehicle seats upwardly beyond the vehicle body contour. The rear window assumes thereby a double function as a window when the vehicle roof is closed and as a wind deflector in the cabriolet configuration of the vehicle. No additional component serving as a wind deflector is needed.

The rear window which consists expediently of glass or a transparent plastic has preferably its own window operating mechanism which is independent of the roof parts or the operating mechanism for the roof parts and by way of which the rear window is supported directly by the vehicle body. It is advantageous if the rear window mechanism permits a lowering of the rear window into a storage compartment for the transfer of the roof parts from a closed position to a cabriolet position without conflicting with the rear window.

When the vehicle roof is closed, the rear window is at least partially surrounded by the vehicle roof and is releasably received in the opening in the vehicle roof. The vehicle roof extends around the rear window preferably along the top edge and the side edges of the window, wherein the sections of the roof parts adjacent the side edges of the window form, at the same time, the C-pillar of the vehicle roof.

The vehicle roof is preferably divided in the longitudinal direction. Preferably, two roof sections are provided disposed at opposite sides of a longitudinal centerline of the roof, which extends in a vertical plane including also the longitudinal vehicle axis.

Because of the longitudinal separation of the vehicle roof, it is possible, particularly in vehicles with a relatively short vehicle interior, that is for example in two-seater convertibles, to have relatively short roof parts. In this way, in comparison with convertible vehicles with transversely extending roof parts, the absolute length of the roof parts is relatively small so that they require relatively small storage dimensions in the convertible configuration of the vehicle. Since the width of the parts of the roof, when divided into two parts, corresponds normally to one half of the vehicle width the storage space can be relatively small.

In this way, the roof parts can be deposited in the storage compartment in an orientation, which is different from their orientation in closed position of the vehicle roof. It may for example be advantageous to deposit the roof parts in the storage compartment one behind the other. During the transition from the closed position to the open position, the roof parts can be pivoted by about 90° about a vertical axis in order for the parts to assume a position, in which the two roof parts are deposited directly adjacent one another without any other roof parts disposed therebetween. In the cabriolet configuration of the vehicle, the roof parts are arranged transversely to the longitudinal vehicle axis, wherein the roof parts are preferably arranged in an upright position, in which the roof parts are essentially vertically oriented. The vertical orientation can be achieved by an additional pivot movement about a transverse axis, the two pivot movements being preferably combined so as to generate a pivot movement about a spatial pivot axis.

With the roof parts stored in an orientation transverse to the longitudinal vehicle axis, only a relatively small storage space in the longitudinal vehicle direction is required, so that the storage compartment may be correspondingly narrow and therefore requires also only a narrow opening, by way of which the roof parts are inserted into the storage compartment. This has the additional advantage that the storage compartment lid is small and no additional drive for the operation of a relatively large storage compartment lid is required.

For the transfer into the storage compartment, the roof parts may be moved rearwardly by a translatory movement in addition to being pivoted.

The opening in the roof parts in which the window is disposed when the vehicle roof is in the closed position may be utilized for a particular compact arrangement of the roof parts in the storage compartment by accommodating the wheel wells of the vehicle, which project into the storage compartment, into the openings of the roof parts. In this way, the limited space available for the storage of the roof parts is utilized in an optimal manner.

The invention will become more readily apparent from the following description thereof on the basis of the accompanying drawings.

DESCRIPTION OF A PREFERRED EMBODIMENT

Figure 1:
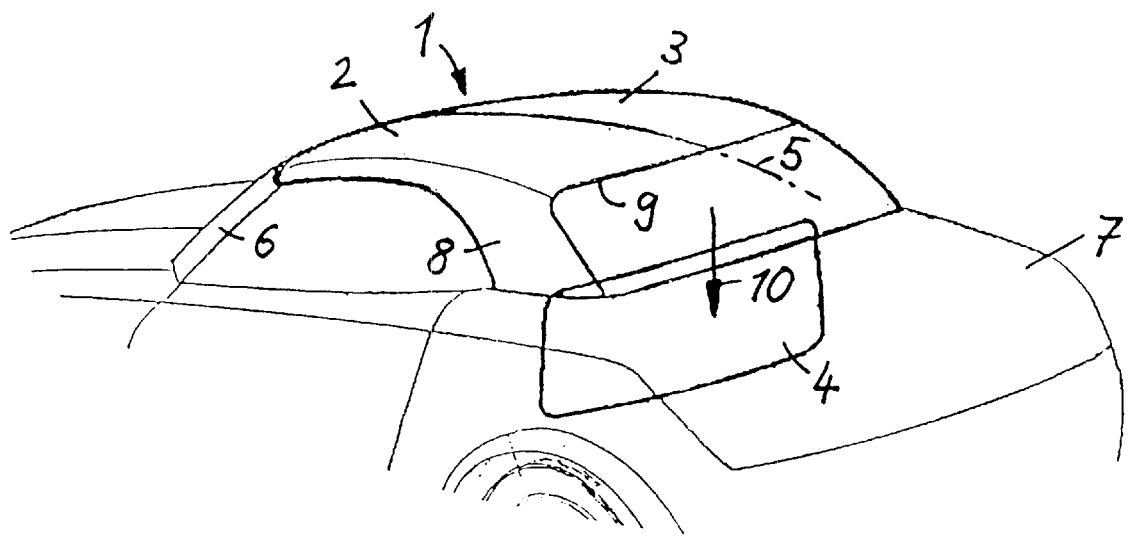
FIG. 1 shows a convertible vehicle with a longitudinally divided hardtop vehicle roof shown in a closed position and with its rear window lowered.

In the figures, identical components are designated by the same reference numerals.

The hardtop roof 1 as shown in FIG. 1 is divided longitudinally and consists of two rigid roof parts 2 and 3, which, in a closed position, extend along a longitudinal separating line 5 that extends essentially parallel to the longitudinal vehicle axis and is disposed in a common vertical plane. The separating line 5 is preferably disposed in the longitudinal center plane of the vehicle and the roof parts 2 and 3 are mirror symmetric to the longitudinal separating line 5. In the area of the separating line 5, the roof parts 2 and 3 are joined in the transverse direction in a wind- and water-tight manner. For joining the two roof parts 2 and 3, a clamping structure or a similar component may be provided whereby a good sealing effect is achieved. Each of the roof parts 2 and 3 extends in the longitudinal vehicle direction essentially over the complete interior vehicle space between the windshield frame 6 and a rear lid 7 which covers a rear trunk. Each roof part 2 or 3 is a one-piece component and comprises a rear side portion which forms a C-pillar 8 when the roof is closed.

The hardtop vehicle roof 1 comprises a rear window 4 which, when closed, is received in an opening 9 in the rear area of the roof parts 2 and 3. The openings 9 in the roof parts 2 and 3 together have an overall dimension corresponding to the dimensions of the rear window 4. In the closed position of the rear window 4, its side edges are in contact with the respective C-pillars 8 of the roof parts 2 and 3 and its top edge is in contact with the transversely extending rear edges of the roof parts 2 and 3, which delimit the opening 9.

The rear window can be moved out of the opening 9 in the roof parts 2 and 3 and can be lowered in the direction of the arrow 10 into a storage compartment 18 (see FIGS. 3 and 4), in order to provide space for the transfer of the roof parts 2 and 3 from the closed position to a storage position or vice versa. For this purpose, the rear window 4 includes its own operating mechanism, by way of which the rear window 4 is coupled to the vehicle body so that it can be lowered and raised independently of any roof operating mechanism. The rear window can expediently be moved between the closed position, in which it is received in the opening 9 in the roof parts 2 and 3 and its open position, in which it is lowered into the storage compartment without opening of the trunk lid 7.

Figure 2:
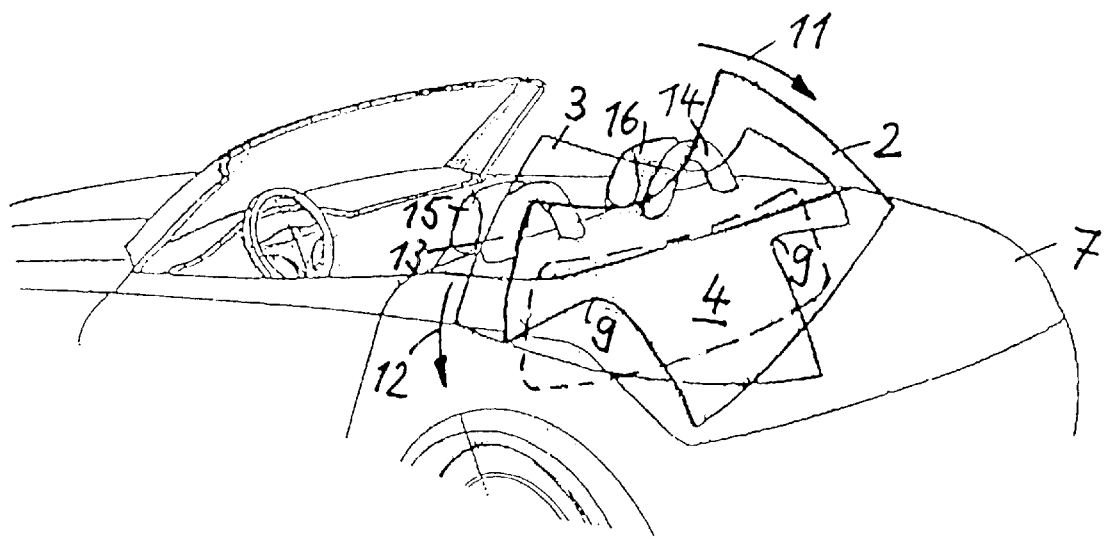
FIG. 2 shows the vehicle roof in an intermediate position between the closed and the open, that is, in the cabriolet position.

FIG. 2 shows an intermediate position of the vehicle roof during the transfer from the closed to open position that is, the cabriolet configuration of the vehicle. The two roof parts 2 and 3 are moved backwardly toward the rear storage compartment by the operating mechanism provided therefor. In this procedure, the roof parts 2 and 3 are pivoted about a spatial axis which is composed of two individual pivot movements one about an axis extending transverse to the longitudinal vehicle direction and the other about a vertical axis wherein during both pivot movements the roof parts are rotated by about 90°. The spatial rotation provided by the individual pivot movements of the roof parts 2 and 3 is indicated in FIG. 2 by the arrows 11 and 12. As a result of this spatial rotation, the roof parts 2 and 3 are disposed in the storage compartment in an upright position and directly behind each other. During the transfer movement of the roof parts 2 and 3 into the storage or, respectively, the cabriolet position the rear window 4 remains lowered into the storage compartment. The roof parts 2 and 3 are deposited directly behind the rear window. The transfer of the roof parts 2 and 3 into the storage compartment may occur with the trunk lid closed. The storage compartment is arranged directly behind the rollover bars 13 and, respectively, 14 provided for the respective driver and passenger seats 15 and 16 in front of the trunk of the vehicle.

Figure 3:
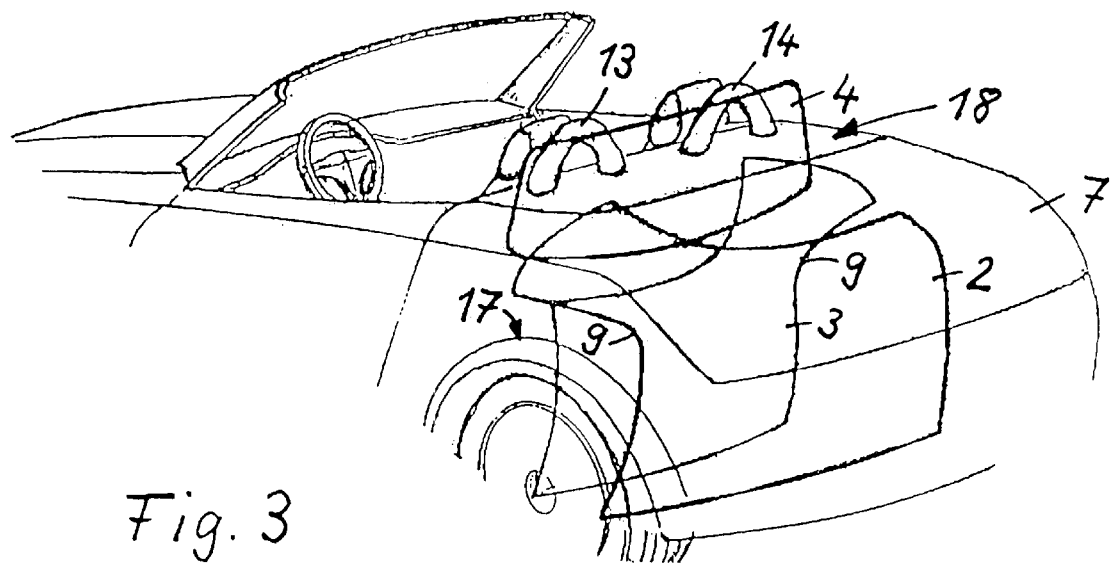
FIG. 3 shows the vehicle roof in a cabriolet position with the rear window raised so as to assume the function of a wind deflector.

FIG. 3 shows the vehicle in cabriolet configuration wherein the roof parts 2 and 3 are deposited in the storage compartment 18 arranged between the trunk which is closed by a trunk lid 7 and the roll-over bars 13 and 14. The roof parts 2 and 3 are deposited completely in the storage compartment 18 and are disposed below the vehicle body contour. As a result of the spatial pivot movement described with reference to FIG. 2 during the transition from the closed position of the vehicle roof to the storage position, the openings 9 in each roof part 2 and, respectively, 3 are disposed in the areas of the wheel wells 17, which extend into the storage compartment. In this way, the roof parts 2 and 3 extend over the wheel wells 17 at opposite sides of the vehicles in a space-saving manner.

The movement of the roof parts 2 and 3 during the transfer from the closed to the storage position occurs in mirror-reversed symmetrical manner with respect to the longitudinal center axis of the vehicle so that, in the storage position in the storage compartment 18, the opening 9 of each roof part 2 or 3 accommodates the respective associated wheel well 17 and the respective roof portion extends over the wheel well.

Figure 4:
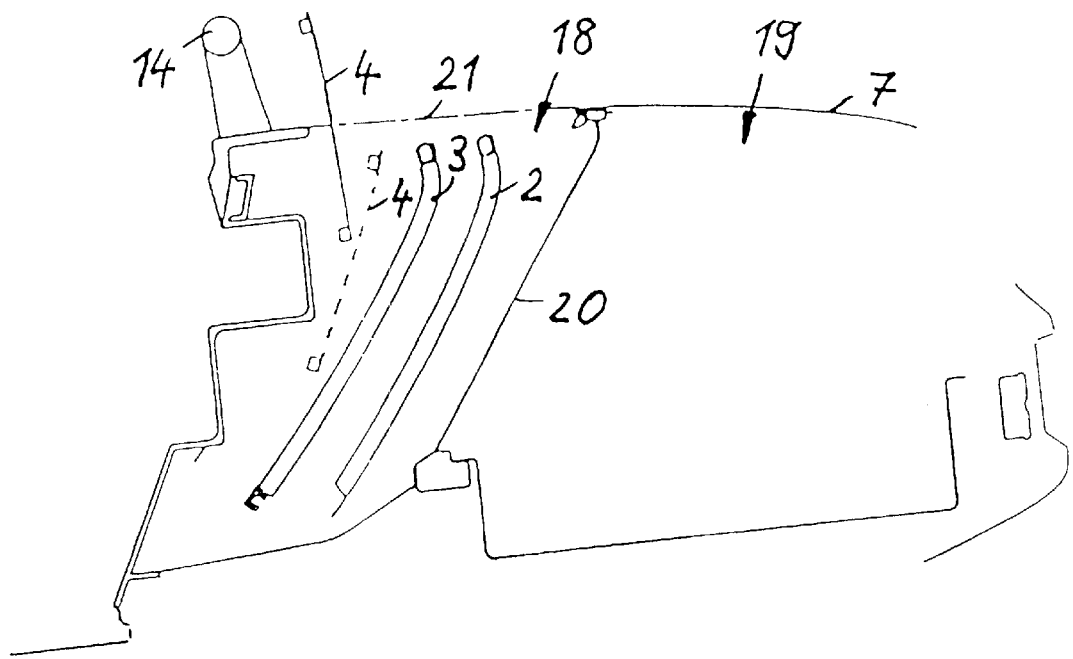
FIG. 4 is a cross-sectional view through the storage compartment of the vehicle in a cabriolet configuration of the vehicle, in which the hardtop vehicle roof is disposed in the storage compartment and the rear window is raised.

FIG. 4 shows that the storage compartment 18 is separated from the trunk 19 by a separation panel 20 which can be removed when the roof is closed or which can be pivoted into an opening position in order to increase the usable trunk volume. The storage space 18 may be covered by a tarpaulin as indicated by a dashed line 21 if desired.

The rear window 4 is movable between a lowered position in which it is disposed in the storage compartment as indicated in FIG. 4 by a dashed line and a raised position as indicated by a solid line, in which the rear window assumes the function of a wind deflector. The movement of the rear window between the lowered and the raised positions is accomplished by a rear window operating mechanism, which is independent from an operating mechanism for the roof parts 2 and 3. In its lowered position, the rear window 4 is disposed adjacent the roof parts 3 and 2 when these parts are disposed in the storage compartment.

In the cabriolet configuration of the vehicle when the vehicle roof is in the storage compartment, the rear window 4 can be raised into a wind deflector position. However, it may at times be desirable to lower the rear window into the storage space when the roof is removed.

It may also be expedient to provide more than two longitudinally separated roof parts. Furthermore, each roof part may extend in the longitudinal vehicle direction only over part of the full roof length.

What is claimed is:

1. A convertible vehicle with a hardtop vehicle roof, said vehicle having a vehicle body with an interior space, a storage compartment for the vehicle roof and a rear trunk, said vehicle roof including at least two roof parts each extending, in a closed position of said vehicle roof, in a longitudinal direction of said vehicle over the full length of said interior space and being movable between said closed position, in which said roof parts cover said interior space and an open position in which said roof parts are disposed in said storage compartment, said hardtop vehicle roof including a rear window disposed in an opening of said hardtop roof when said vehicle roof is closed and being removable from said roof and movable to a raised upright position so as to form a wind deflector and a lowered position when said vehicle is in a cabriolet configuration, said rear window and said roof parts being disposed in said storage compartment in an upright position in the longitudinal vehicle direction behind one another when said vehicle is in the cabriolet configuration.

2. A convertible vehicle according to claim 1, wherein said rear window is directly supported by said vehicle body and independently operable from said roof parts.

3. A convertible vehicle according to claim 1, wherein said roof parts have rear cut-outs which, in the closed position of the roof, form jointly said opening in which said rear window is removably received.

4. A convertible vehicle according to claim 3, wherein in said closed position each of said roof parts engages said window along a top edge portion and a side edge of said window.

5. A convertible vehicle according to claim 1, wherein each of said roof parts has a side section extending along a side edge of said window and forming a C-pillar of said vehicle roof.

6. A convertible vehicle according to claim 3, wherein said roof parts when disposed in said storage compartment are so arranged that wheel wells of said vehicle protruding from opposite sides into said storage compartment are accommodated by the cutouts in said vehicle roof parts.

* * * * *